US012322317B1

(12) United States Patent
Wu

(10) Patent No.: US 12,322,317 B1
(45) Date of Patent: Jun. 3, 2025

(54) COMPENSATING CIRCUIT AND COMPENSATING METHOD FOR PIXEL DATA OF DISPLAY DEVICE

(71) Applicant: HIMAX TECHNOLOGIES LIMITED, Tainan (TW)

(72) Inventor: Tung-Ying Wu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/527,332

(22) Filed: Dec. 3, 2023

(51) Int. Cl.
*G09G 3/32* (2016.01)
*G09G 3/20* (2006.01)

(52) U.S. Cl.
CPC ... *G09G 3/2003* (2013.01); *G09G 2320/0233* (2013.01); *G09G 2320/0242* (2013.01); *G09G 2320/0666* (2013.01); *G09G 2360/16* (2013.01)

(58) Field of Classification Search
CPC .......................................................... G09G 3/32
See application file for complete search history.

(56) References Cited

U.S. PATENT DOCUMENTS

2013/0169693 A1* 7/2013 Pyo ...................... G09G 3/3225 345/76
2016/0329019 A1* 11/2016 An ........................... G09G 3/20
2020/0286431 A1* 9/2020 Sugiyama ............ G09G 3/2003

* cited by examiner

*Primary Examiner* — Joseph R Haley
(74) *Attorney, Agent, or Firm* — JCIPRNET

(57) ABSTRACT

A compensating circuit and a compensating method for a pixel data of a display device are provided. The compensating circuit includes a color calculator, a gain value generator and a calculating circuit. The color calculator generates a color value according to a color of the pixel data. The gain value generator generates a first gain value according to the color value and a duty cycle of an emission driving signal, and generates a second gain value according to the duty cycle and a gray value of the pixel data. The calculating circuit calculates a compensated pixel data according to the pixel data, the first gain value and the second gain value.

16 Claims, 8 Drawing Sheets

COMPENSATING CIRCUIT AND COMPENSATING METHOD FOR PIXEL DATA OF DISPLAY DEVICE

BACKGROUND

Technical Field

The disclosure generally relates to a compensating circuit and a compensating method, and more particularly to a compensating circuit and a compensating method for a pixel data of a display device.

Description of Related Art

Currently, a pixel of a display device (for example, a LED display device or an OLED display device) is driven by a pixel data and an emission driving signal. However, a plurality of brightness of sub-pixels of the pixel are different based on a same emission driving signal.

For example, please refer to FIG. 1, FIG. 1 illustrates a schematic diagram of brightness of different color of a pixel based on an emission driving signal. When the emission driving signal having low duty cycle, the trends corresponding to the brightness BR of different colors CLR1 to CLR5 are not similar with the same emission driving signal. It means that the brightness BR of different color CLR1 to CLR5 of the pixel are nonlinear or have a different brightness trend when the emission driving signal having low duty cycle.

Thus, how to compensate pixel data to improve nonlinear the brightness of different color of the pixel is one of the research and development focuses of those skilled in the art.

SUMMARY

The disclosure provides a compensating circuit and a compensating method for a pixel data of a display device. The compensating circuit and the compensating method can compensate pixel data to improve nonlinear the brightness of different color.

The compensating circuit of the disclosure includes a color calculator, a gain value generator and a calculating circuit. The color calculator generates a hue value according to a color of the pixel data. The gain value generator is coupled to the color calculator. The gain value generator generates a first gain value according to the color value and a duty cycle of an emission driving signal, and generates a second gain value according to the duty cycle and a gray value of the pixel data. The calculating circuit is coupled to the gain value generator. The calculating circuit calculates a compensated pixel data according to the pixel data, the first gain value and the second gain value.

The compensating method of the disclosure includes: generating a color value according to a color of the pixel data; generating a first gain value according to the color value and a duty cycle of an emission driving signal; generating a second gain value according to the duty cycle and a gray value of the pixel data; and calculating a compensated pixel data according to the pixel data, the first gain value and the second gain value.

Based on the above, the compensating circuit and the compensating method generate the first gain value according to the color value and the duty cycle of the emission driving signal, generate the second gain value according to the duty cycle and a gray value of the pixel data and calculate the compensated pixel data according to the pixel data, the first gain value and the second gain value. The pixel data is compensated based on the color value, the gray value and the duty cycle of the emission driving signal to be the compensated pixel data. Therefore, the compensating circuit and the compensating method can compensate pixel data to improve a linearity of the brightness of different color.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

A disclosure may be understood by reference to the following detailed description, taken in conjunction with the drawings as described below. It is noted that, for purposes of illustrative clarity and being easily understood by the readers, various drawings of this disclosure show a portion of an electronic device, and certain elements in various drawings may not be drawn to scale. In addition, the number and dimension of each device shown in drawings are only illustrative and are not intended to limit the scope of a disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms “include”, “comprise” and “have” are used in an open-ended fashion, and thus should be interpreted to mean “include, but not limited to . . . ”. Thus, when the terms “include”, “comprise” and/or “have” are used in the description of a disclosure, the corresponding features, areas, steps, operations and/or components would be pointed to existence, but not limited to the existence of one or a plurality of the corresponding features, areas, steps, operations and/or components.

It will be understood that when an element is referred to as being “coupled to”, “connected to”, or “conducted to” another element, it may be directly connected to the other element and established directly electrical connection, or intervening elements may be presented therebetween for relaying electrical connection (indirectly electrical connection). In contrast, when an element is referred to as being “directly coupled to”, “directly conducted to”, or “directly connected to” another element, there are no intervening elements presented.

Figure 1:
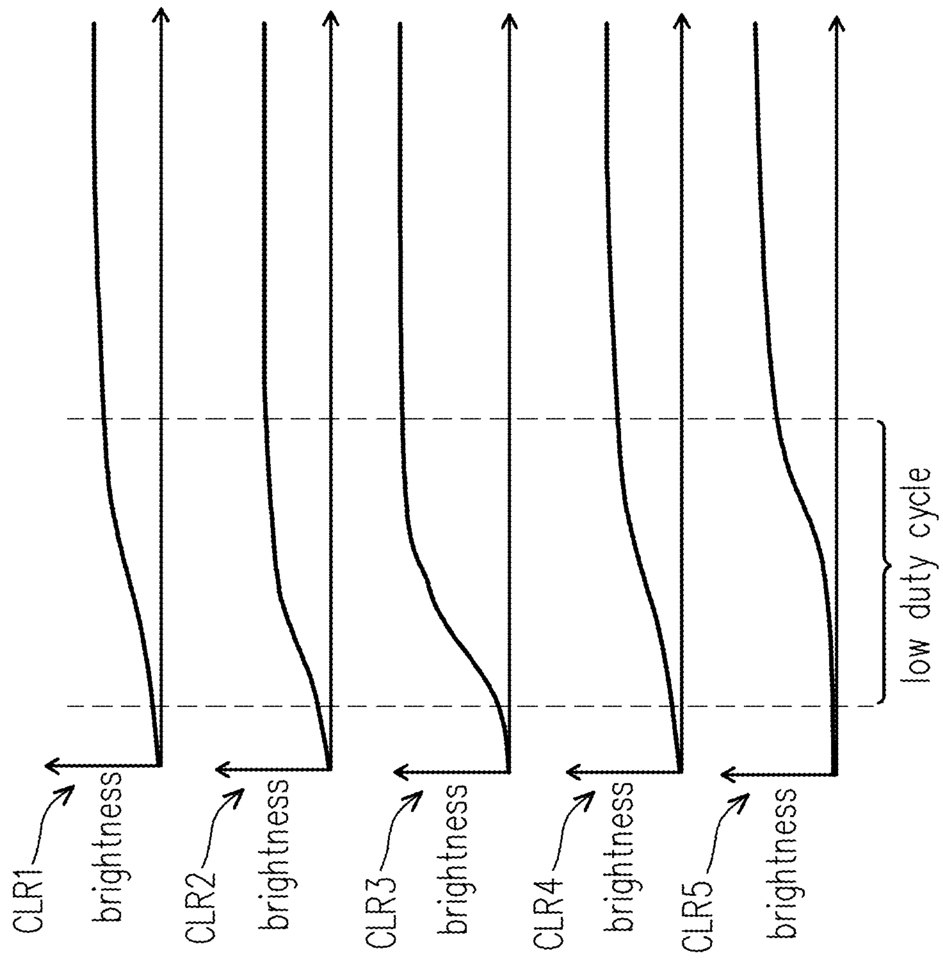
FIG. 1 (PRIOR ART)
FIG. 1 illustrates a schematic diagram of brightness of different color of a pixel based on an emission driving signal.
Figure 2:
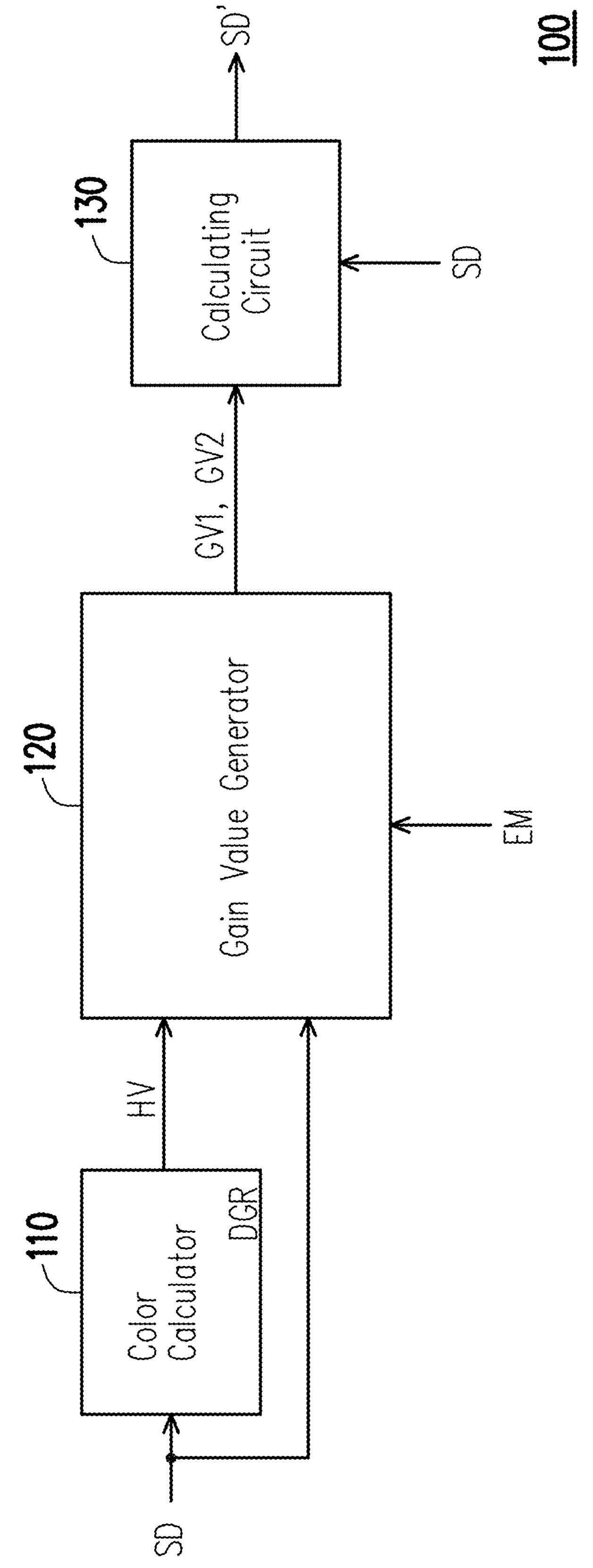
FIG. 2 illustrates a compensating circuit according to an embodiment of the disclosure.

Please refer to FIG. 2, FIG. 2 illustrates a compensating circuit according to an embodiment of the disclosure. In the embodiment, the compensating circuit 100 includes a color calculator 110, a gain value generator 120 and a calculating circuit 130. The color calculator 110 receives a pixel data SD and obtains a color CLR of the pixel data SD. The color calculator 110 generates a color value HV according to the pixel data SD. The gain value generator 120 is coupled to the color calculator 110. The gain value generator 120 generates a first gain value GV1 according to the color value HV and a duty cycle of an emission driving signal EM. The gain value generator 120 generates a second gain value GV2 according to the duty cycle and a gray value of the pixel data SD.

In the embodiment, the calculating circuit 130 is coupled to the gain value generator 120. The calculating circuit 130 calculates a compensated pixel data SD' according to the pixel data SD, the first gain value GV1 and the second gain value GV2.

It should be noted, the compensating circuit 100 generates the first gain value GV1 according to the color value HV and the duty cycle of the emission driving signal EM, generates the second gain value GV2 according to the duty cycle and the gray value of the pixel data SD, and calculates the compensated pixel data SD' according to the pixel data SD, the first gain value GV1 and the second gain value GV2. The pixel data SD is compensated based on the color value HV, the gray value and the duty cycle of the emission driving signal EM to be the compensated pixel data SD'. Therefore, the compensating circuit 100 can compensate pixel data SD to improve a linearity of the brightness of different color.

For example, the color value HV may be a hue value. The color calculator 110 obtains a degree DGR of the color of the pixel data SD according to a color space. The color calculator 110 generates the color value HV e according to the degree DGR. For example, when the color is “red”, the degree DGR is 0°. Therefore, the color value HV is “0”. When the color is “yellow”, the degree DGR is 60°. Therefore, the color value HV is “60”. When the color is “green”, the degree DGR is 120°. Therefore, the color value HV is “120”. When the color is “blue”, the degree DGR is 240°. Therefore, the color value HV is “240”. When the color is “pink”, the degree DGR is 300°. Therefore, the color value HV is “300”.

Figure 3:
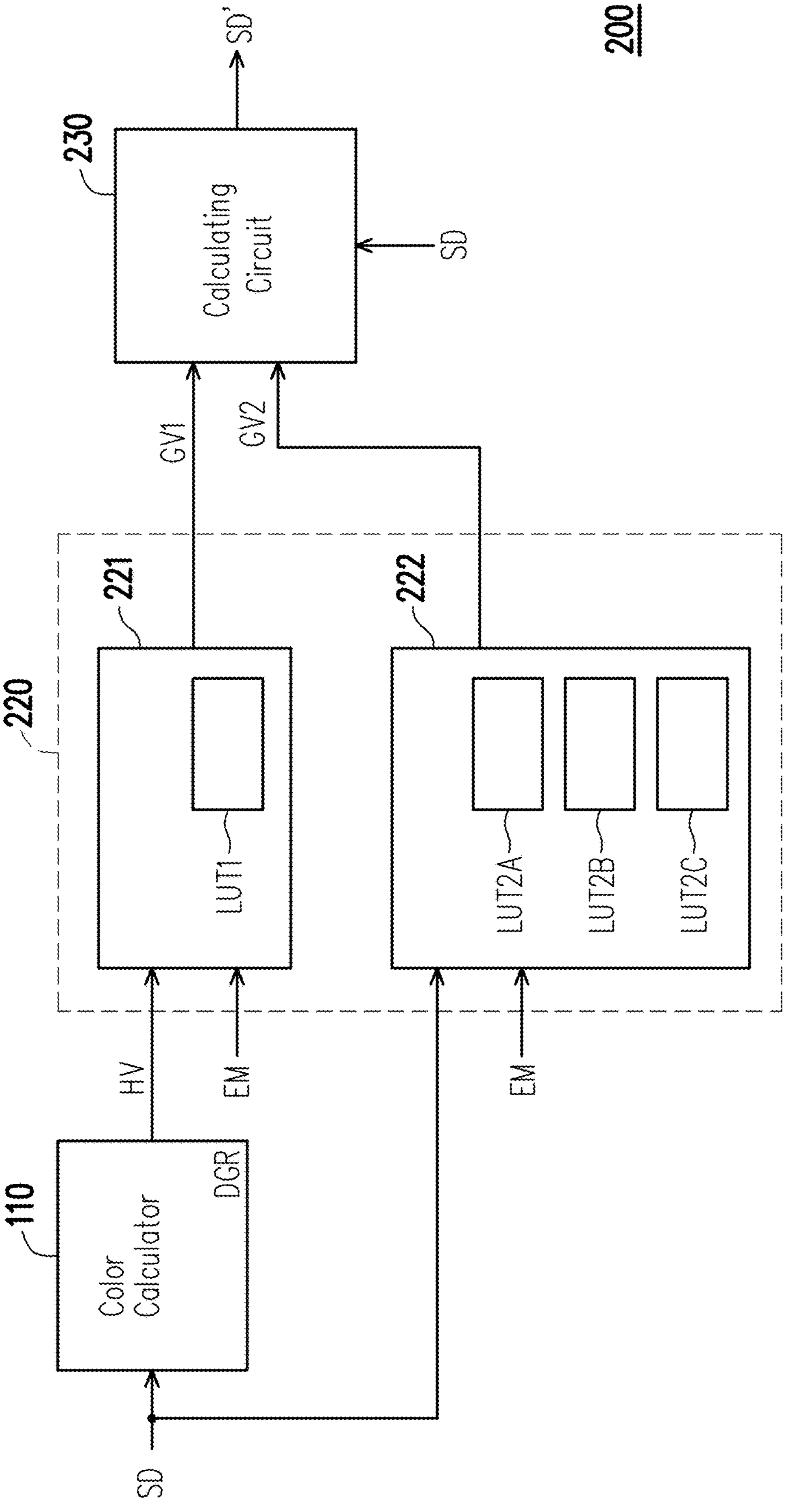
FIG. 3 illustrates a compensating circuit according to an embodiment of the disclosure.

Please refer to FIG. 3, FIG. 3 illustrates a compensating circuit according to an embodiment of the disclosure. In the embodiment, the compensating circuit 200 includes the color calculator 110, a gain value generator 220 and a calculating circuit 230. The color calculator 110 has been clearly explained in the embodiments of FIG. 2, so it will not be repeated here. The gain value generator 220 includes a first generating circuit 221 and a second generating circuit 222. The first generating circuit 221 is coupled to the color calculator 110. The first generating circuit 221 generates the first gain value GV1 according to the color value HV and the duty cycle of the emission driving signal EM. The second generating circuit 222 generate the second gain value GV2 according to the duty cycle of the emission driving signal EM and the gray value of the pixel data SD.

In the embodiment, the first generating circuit 221 includes a first look-up table LUT1. The first look-up table LUT1 stores a plurality of first values corresponding different hue values of the pixel data SD and different duty cycles of the emission driving signal EM. The second generating circuit 222 includes a second look-up tables LUT2A, LUT2B, LUT2C corresponding to different colors. For example, the second look-up table LUT2A stores a plurality of second values corresponding different gray values of a red data of the pixel data SD and different duty cycles of the emission driving signal EM. The second look-up table LUT2B stores a plurality of second values corresponding different gray values of a green data of the pixel data SD and different duty cycles of the emission driving signal EM. The second look-up table LUT2C stores a plurality of second values corresponding different gray values of a blue data of the pixel data SD and different duty cycles of the emission driving signal EM.

Figure 4A:
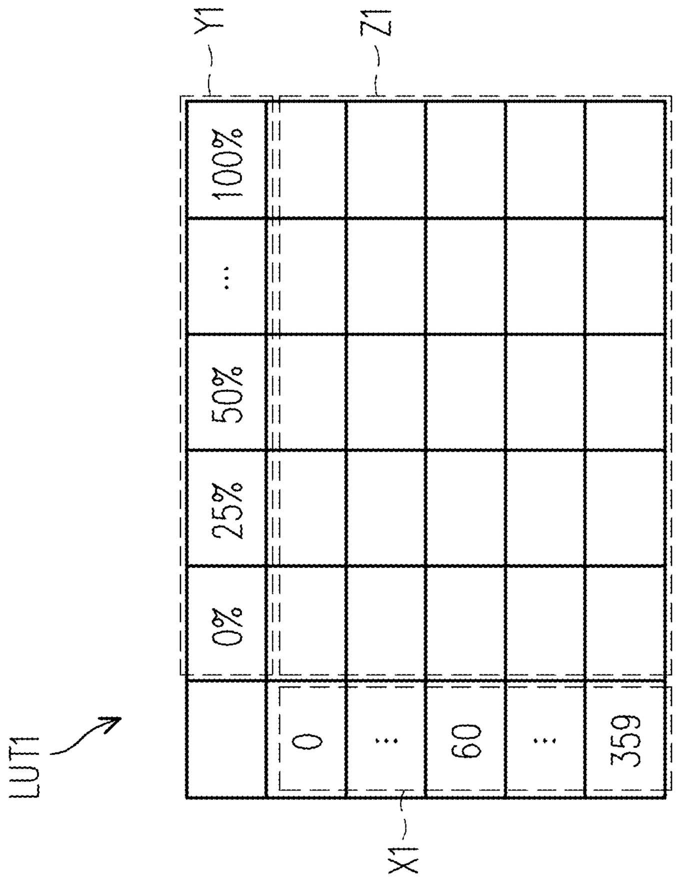
FIG. 4A illustrates a first look-up table according to an embodiment of the disclosure.

Please refer to FIG. 3 and FIG. 4A, FIG. 4A illustrates a first look-up table according to an embodiment of the disclosure. In the embodiment, the first look-up table LUT1 includes regions X1, Y1 and Z1. The region X1 records different hue values of the pixel data SD. The hue values of the pixel data SD are “0” to “359”. The region Y1 records different duty cycles of the emission driving signal EM. The duty cycles are 0% to 100%. The region Z1 stores a plurality the first values corresponding the hue values of the pixel data SD and the duty cycles of the emission driving signal EM. In the embodiment, the first generating circuit 221 selects one of the first values in the region Z1 to be the first gain value GV1 according to the pixel data SD and the emission driving signal EM.

Figure 4B:
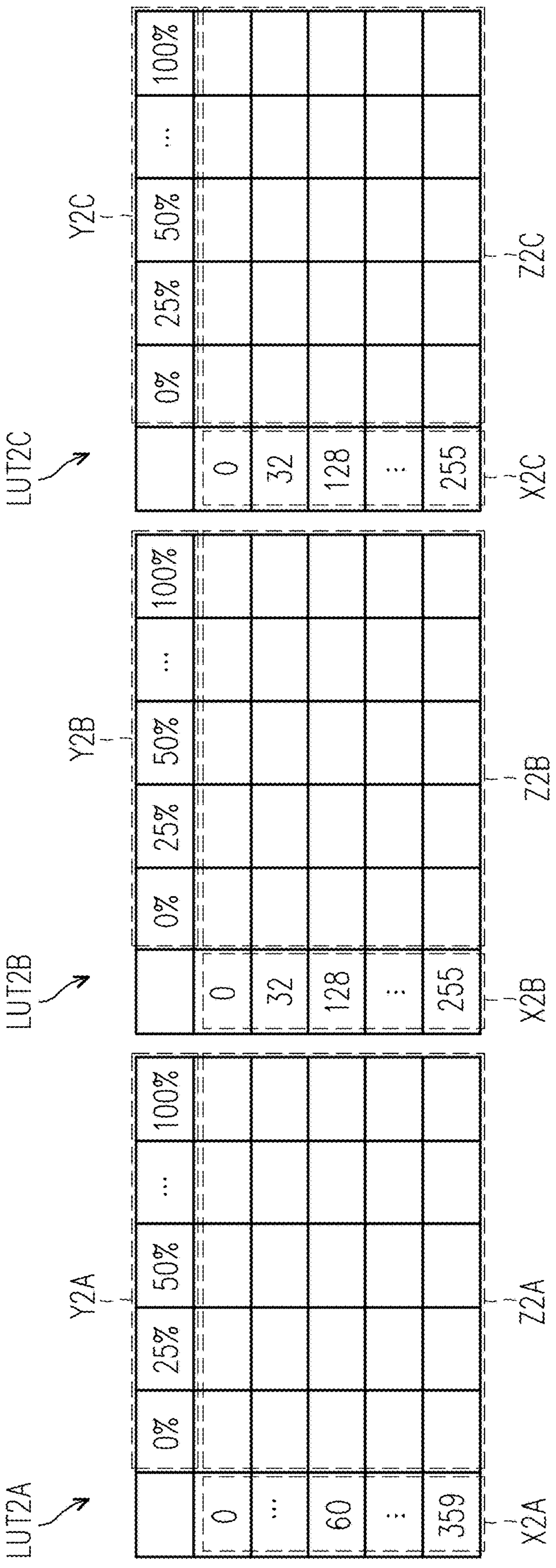
FIG. 4B illustrates second look-up tables according to an embodiment of the disclosure.

Please refer to FIG. 3 and FIG. 4B, FIG. 4B illustrates second look-up tables according to an embodiment of the disclosure. In the embodiment, for example, the second look-up table LUT2A is used to red of the pixel data SD. The second look-up table LUT2B is used to green of the pixel data SD. The second look-up table LUT2C is used to blue of the pixel data SD, but the disclosure is not limited thereto. The second look-up table LUT2A includes regions X2A, Y2A and Z2A. The region X2A records different gray values of red of the pixel data SD. The gray values of the pixel data SD are “0” to “255”. The region Y2A records the duty cycles of the emission driving signal EM. The duty cycles are 0% to 100%. The region Z2A stores a plurality the second values of red corresponding the gray values of the pixel data SD and the duty cycles of the emission driving signal EM. In the embodiment, the second generating circuit 222 selects one of the second values of red to be the second gain value GV2 of red according to the pixel data SD and the emission driving signal EM. The second look-up table LUT2B includes regions X2B, Y2B and Z2B. The region X2B records different gray values of green of the pixel data SD. The gray values of green of the pixel data SD are “0” to “255”. The region Y2B records the duty cycles of the emission driving signal EM. The duty cycles are 0% to 100%. The region Z2B stores a plurality the second values of green corresponding the gray values of the pixel data SD and the duty cycles of the emission driving signal EM. In the embodiment, the second generating circuit 222 selects one of the second values of green to be the second gain value GV2 of green according to the pixel data SD and the emission driving signal EM. The second look-up table LUT2C includes regions X2C, Y2C and Z2C. The region X2C records different gray values of blue of the pixel data SD. The gray values of the pixel data SD are “0” to “255”. The region Y2C records the duty cycles of the emission driving signal EM. The duty cycles are 0% to 100%. The region Z2C stores a plurality the second values of blue corresponding the gray values of the pixel data SD and the duty cycles of the emission driving signal EM. In the embodiment, the second generating circuit 222 selects one of the second values of blue to be the second gain value GV2 of blue according to the pixel data SD and the emission driving signal EM.

In the embodiment, the calculating circuit 230 is coupled to the first generating circuit 221 and the second generating circuit 222. The calculating circuit 230 multiplies the pixel data SD, the first gain value GV1 and the second gain value GV2 to generate the compensated pixel data SD'. In the embodiment, the calculating circuit 230 multiplies a gray value of the pixel data SD, the first gain value GV1 and the second gain value GV2 to generate the compensated pixel data SD'. In some embodiments, the calculating circuit 230 may be implemented by a multiplier circuit, but the disclosure is not limited thereto.

For example, the color is "white". The gray value of a red channel of the pixel data SD are "32". The gray value of a green channel of the pixel data SD are "32". The gray value of a blue channel of the pixel data SD are "32". The duty cycle of the emission driving signal EM is 25%. A color value HV of the red channel is "0". A color value HV of the green channel is "120". A color value HV of the blue channel is "240". The first generating circuit 221 generates first gain values corresponding the different channels. A first gain value GV1 of the red channel is "1.2". A first gain value GV1 of the green channel is "1.2". A first gain value GV1 of the blue channel is "1.2". The second generating circuit 222 generates second gain values corresponding the different channels. A second gain value GV2 of the red channel is "1.2". A second gain value GV2 of the green channel is "1.5". A second gain value GV2 of the blue channel is "1.5".

The calculating circuit 230 multiplies the gray value of the red channel of the pixel data SD, the first gain value GV1 of the red channel of the pixel data SD and the second gain value GV2 of the red channel of the pixel data SD to generate a gray value of a red channel of the compensated pixel data SD'. Therefore, the gray value of the red channel of the compensated pixel data SD' is "48" (that is, "32"×"1.2"×"1.2").

The calculating circuit 230 multiplies the gray value of the green channel of the pixel data SD, the first gain value GV1 of the green channel of the pixel data SD and the second gain value GV2 of the green channel of the pixel data SD to generate a gray value of a green channel of the compensated pixel data SD'. Therefore, the gray value of the green channel of the compensated pixel data SD' is "58" (that is, "32"×"1.2"×"1.5").

Besides, the calculating circuit 230 multiplies the gray value of the blue channel of the pixel data SD, the first gain value GV1 of the blue channel of the pixel data SD and the second gain value GV2 of the blue channel of the pixel data SD to generate a gray value of a blue channel of the compensated pixel data SD'. Therefore, the gray value of the blue channel of the compensated pixel data SD' is "58" (that is, "32"×"1.2"×"1.5").

Base on above, the pixel data SD having the gray value "32/32/32" is compensated to be the compensated pixel data SD' having the gray value "48/58/58" when the duty cycle of the emission driving signal EM is 25%.

For example, the color is "green". The gray value of a red channel of the pixel data SD are "0". The gray value of a green channel of the pixel data SD are "32". The gray value of a blue channel of the pixel data SD are "0". The duty cycle of the emission driving signal EM is 25%. A color value HV of the red channel is "0". A color value HV of the green channel is "120". A color value HV of the blue channel is "240". The first generating circuit 221 generates first gain values corresponding the different channels. A first gain value GV1 of the red channel is "1.5". A first gain value GV1 of the green channel is "1.5". A first gain value GV1 of the blue channel is "1.5". The second generating circuit 222 generates second gain values corresponding the different channels. A second gain value GV2 of the red channel is "1.6". A second gain value GV2 of the green channel is "1.5". A second gain value GV2 of the blue channel is "1.6".

The calculating circuit 230 multiplies the gray value of the red channel of the pixel data SD, the first gain value GV1 of the red channel of the pixel data SD and the second gain value GV2 of the red channel of the pixel data SD to generate a gray value of a red channel of the compensated pixel data SD'. Therefore, the gray value of the red channel of the compensated pixel data SD' is "0" (that is, "0"×"1.5"×"1.6").

The calculating circuit 230 multiplies the gray value of the green channel of the pixel data SD, the first gain value GV1 of the green channel of the pixel data SD and the second gain value GV2 of the green channel of the pixel data SD to generate a gray value of a green channel of the compensated pixel data SD'. Therefore, the gray value of the green channel of the compensated pixel data SD' is "72" (that is, "32"×"1.5"×"1.5").

Besides, the calculating circuit 230 multiplies the gray value of the blue channel of the pixel data SD, the first gain value GV1 of the blue channel of the pixel data SD and the second gain value GV2 of the blue channel of the pixel data SD to generate a gray value of a blue channel of the compensated pixel data SD'. Therefore, the gray value of the blue channel of the compensated pixel data SD' is "0" (that is, "0"×"1.5"×"1.6").

Base on above, the pixel data SD having the gray value "0/32/0" is compensated to be the compensated pixel data SD' having the gray value "0/72/0" when the duty cycle of the emission driving signal EM is 25%.

Figure 5:
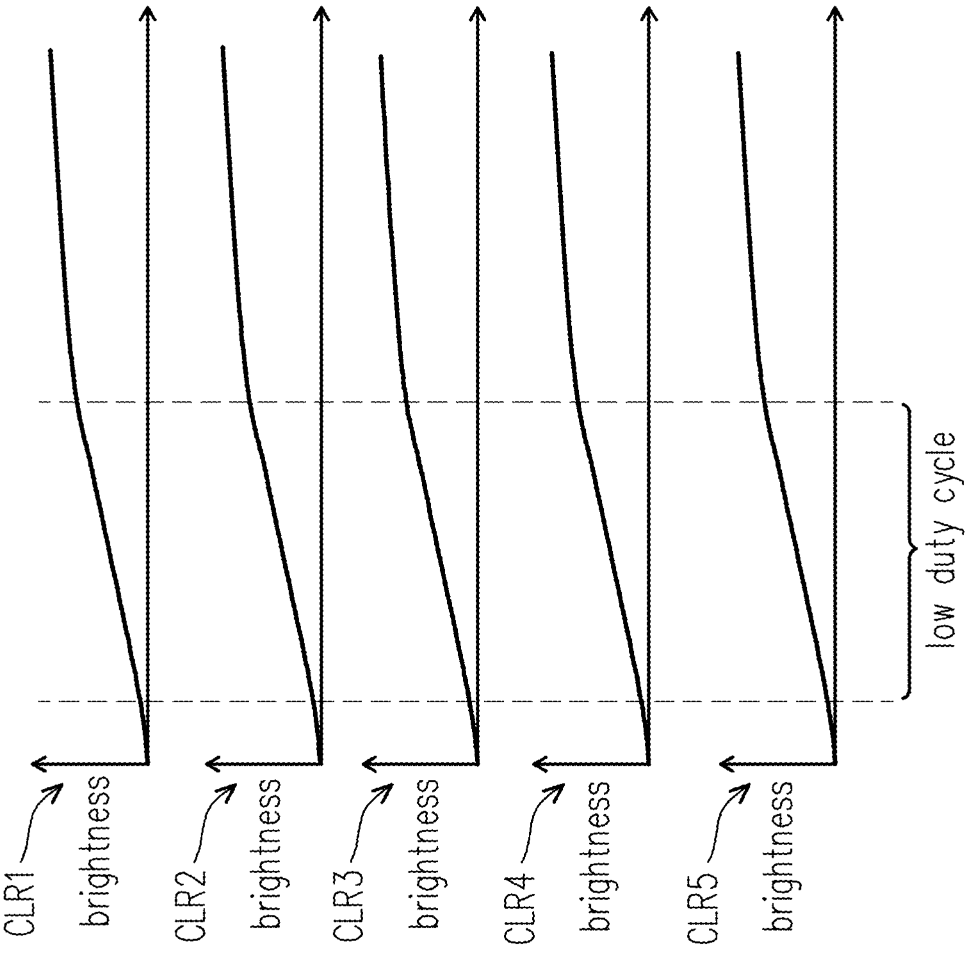
FIG. 5 illustrates a schematic diagram of brightness of different color based on an emission driving signal according to an embodiment of the disclosure.

Please refer to FIG. 2 and FIG. 5, FIG. 5 illustrates a schematic diagram of brightness of different color based on an emission driving signal according to an embodiment of the disclosure. In the embodiment, the pixel data SD is compensated to be the compensated pixel data SD' based the duty cycle of the emission driving signal EM and the colors CLR1 to CLR5. The brightness trends of different colors are similar. Therefore, the linearity of the brightness of different color could be improved.

Figure 6:
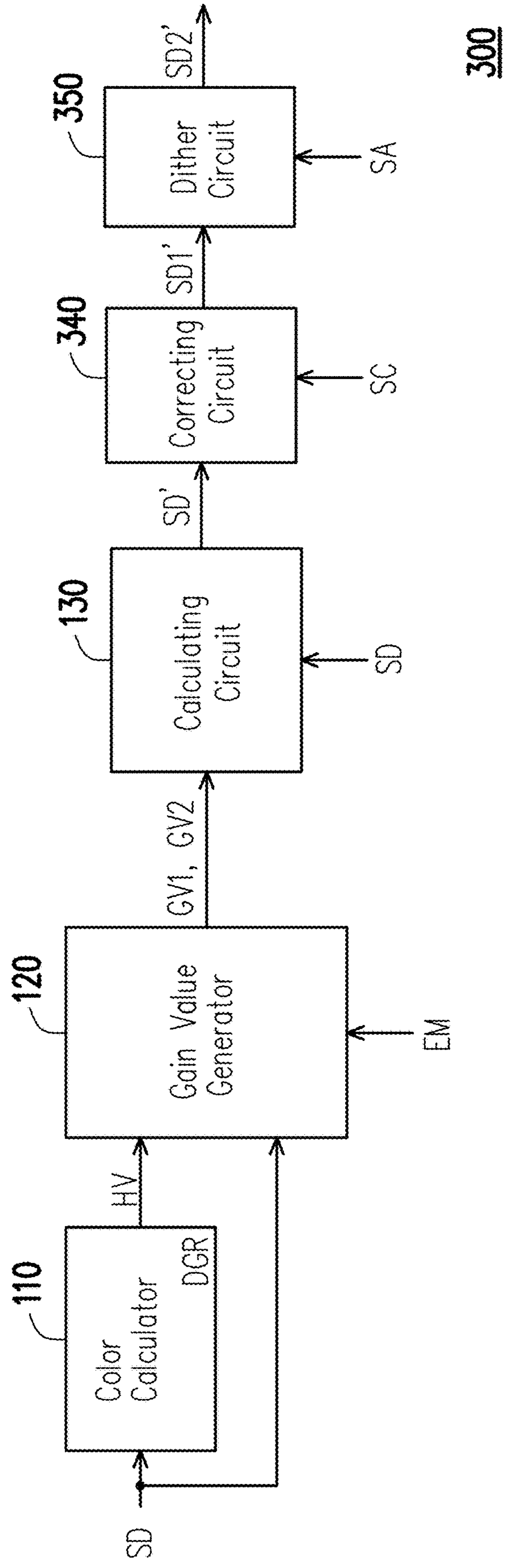
FIG. 6 illustrates a compensating circuit according to an embodiment of the disclosure.

Please refer to FIG. 6, FIG. 6 illustrates a compensating circuit according to an embodiment of the disclosure. In the embodiment, the compensating circuit 300 includes the color calculator 110, the gain value generator 120, the calculating circuit 130, a correcting circuit 340 and a dither circuit 350. The color calculator 110, the gain value generator 120, the calculating circuit 130 have been clearly explained in the embodiments of FIG. 2, so it will not be repeated here.

In the embodiment, the correcting circuit 340 is coupled to the calculating circuit 130. The correcting circuit 340 corrects a color temperature of the compensated pixel data SD' in response to a correcting command SC. The dither circuit 350 is coupled to the correcting circuit 340. The dither circuit 350 adjusts a resolution of the compensated pixel data SD' by a dither operation in response to an adjusting command SA. In the embodiment, the correcting circuit 340 corrects the color temperature of the compensated pixel data SD' to generate corrected pixel data SD1'. A resolution of the corrected pixel data SD1' is equal to the resolution of the compensated pixel data SD'. The dither circuit 350 receives the corrected pixel data SD1' and adjusts the resolution to generate adjusted pixel data SD2'.

Figure 7:
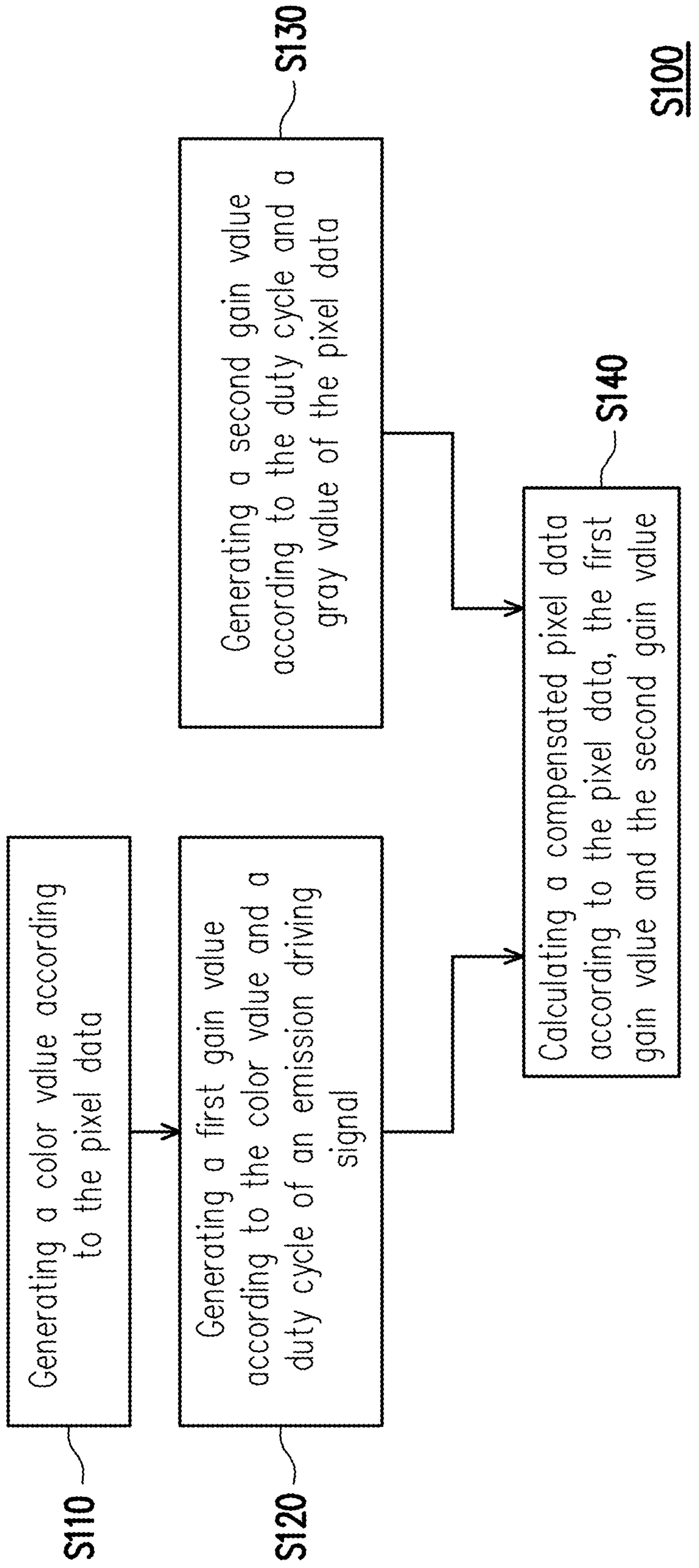
FIG. 7 illustrates a compensating method according to an embodiment of the disclosure.

Please refer to FIG. 2 and FIG. 7, FIG. 7 illustrates a compensating method according to an embodiment of the disclosure. In the embodiment, the compensating method S100 includes steps S110 to S140. In the step S110, the color calculator 110 generates the color value HV according to the color of the pixel data SD. In the step S120, the gain value generator 120 generates the first gain value GV1 according to the color value HV and the duty cycle of an emission driving signal EM. In the step S130, the gain value generator 120 generates the second gain value GV2 according to the duty cycle of an emission driving signal EM and a gray value of the pixel data SD. In the step S140, the calculating circuit 130 calculates a compensated pixel data SD' according to the pixel data SD, the first gain value GV1 and the second gain value GV2. The steps S110 to S140 have been clearly explained in the embodiments of FIG. 2 to FIG. 4, so it will not be repeated here.

In view of the foregoing, the compensating circuit and the compensating method generate the first gain value according to the hue value and the duty cycle of the emission driving signal, generate the second gain value according to the duty cycle and a gray value of the pixel data and calculate the compensated pixel data according to the pixel data, the first gain value and the second gain value. The compensating circuit and the compensating method compensate the pixel data based on the hue value, the gray value and the duty cycle of the emission driving signal to be the compensated pixel data. Therefore, the compensating circuit and the compensating method can compensate pixel data to improve a linearity of the brightness of different color.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A compensating circuit for a pixel data of a display device, comprising:
- a color calculator, configured to generate a color value according to the pixel data;
- a gain value generating circuit, coupled to the color calculator, and configured to generate a first gain value according to the color value and a duty cycle of an emission driving signal, and generate a second gain value according to the duty cycle and a gray value of the pixel data; and
- a calculating circuit, coupled to the gain value generating circuit, and configured to calculate a compensated pixel data according to the pixel data, the first gain value and the second gain value,
- wherein the color value is a hue value, and
- wherein the color calculator obtains a degree of the color of the pixel data according to a color space, and generate the hue value according to the degree.

2. The compensating circuit of claim 1, wherein the gain value generating circuit comprises:
- a first generating circuit, coupled to the color calculator, and configured to generate the first gain value according to the color value and the duty cycle; and
- a second generating circuit, configured to generate the second gain value according to the duty cycle and the gray value.

3. The compensating circuit of claim 2, wherein:
- the first generating circuit comprises a first look-up table, and
- the first look-up table stores a plurality of first values corresponding different color values of the pixel data and different duty cycles of the emission driving signal.

4. The compensating circuit of claim 3, wherein the first generating circuit selects one of the plurality of first values to be the first gain value according to the pixel data and the emission driving signal.

5. The compensating circuit of claim 3, wherein:
- the second generating circuit comprises a plurality of second look-up tables corresponding different colors, and
- each of the plurality of second look-up table stores a plurality of second values corresponding different gray values of the pixel data and different duty cycles of the emission driving signal.

6. The compensating circuit of claim 5, wherein the second generating circuit selects one of the plurality of second values to be the second gain value according to the pixel data and the emission driving signal.

7. The compensating circuit of claim 1, wherein the calculating circuit multiplies the pixel data, the first gain value and the second gain value to generate the compensated pixel data.

8. The compensating circuit of claim 1, further comprising:
- a correcting circuit, coupled to the calculating circuit, and configured to correct a color temperature of the compensated pixel data in response to a correcting command.

9. The compensating circuit of claim 8, further comprising:
- a dither circuit, coupled to the correcting circuit, and configured to adjust a resolution of the compensated pixel data by a dither operation in response to an adjusting command.

10. A compensating method for a pixel data of a display device, comprising:
- generating a color value according to the pixel data;
- generating a first gain value according to the color value and a duty cycle of an emission driving signal;
- generating a second gain value according to the duty cycle and a gray value of the pixel data; and
- calculating a compensated pixel data according to the pixel data, the first gain value and the second gain value,
- wherein the color value is a hue value, and
- wherein generating the color value according to the color of the pixel data comprises:
  - obtaining a degree of the color of the pixel data according to a color space, and generate the hue value according to the degree.

11. The compensating method of claim 10, further comprising:
- providing a first look-up table and a second look-up table,
- wherein the first look-up table stores a plurality of first values corresponding different color values of the pixel data and different duty cycles of the emission driving signal, and wherein the second look-up table stores a plurality of second values corresponding different gray values of the pixel data and different duty cycles of the emission driving signal.

12. The compensating method of claim 11, wherein generating the first gain value according to the color value and a duty cycle of the emission driving signal comprises:

selecting one of the plurality of first values to be the first gain value according to the pixel data and the emission driving signal.

13. The compensating method of claim 11, wherein generate the second gain value according to the duty cycle and the gray value of the pixel data comprises:

selecting one of the plurality of second values to be the second gain value according to the pixel data and the emission driving signal.

14. The compensating method of claim 10, wherein calculating the compensated pixel data according to the pixel data, the first gain value and the second gain value comprises:

multiplying the pixel data, the first gain value and the second gain value to generate the compensated pixel data.

15. The compensating method of claim 10, further comprising:

correcting a color temperature of the compensated pixel data in response to a correcting command.

16. The compensating method of claim 15, further comprising:

adjusting a resolution of the compensated pixel data in response to an adjusting command.

* * * * *